Figure 1:
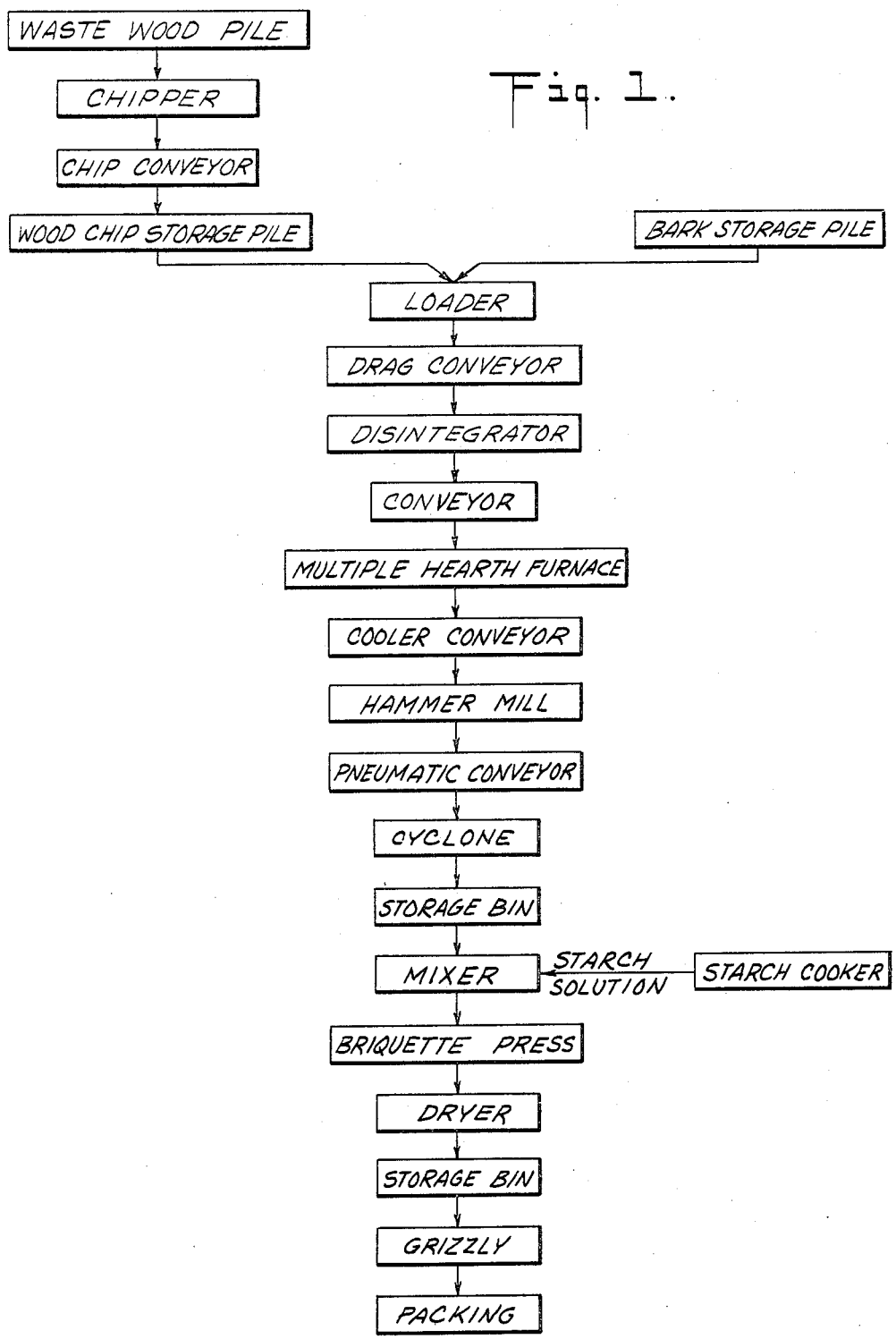

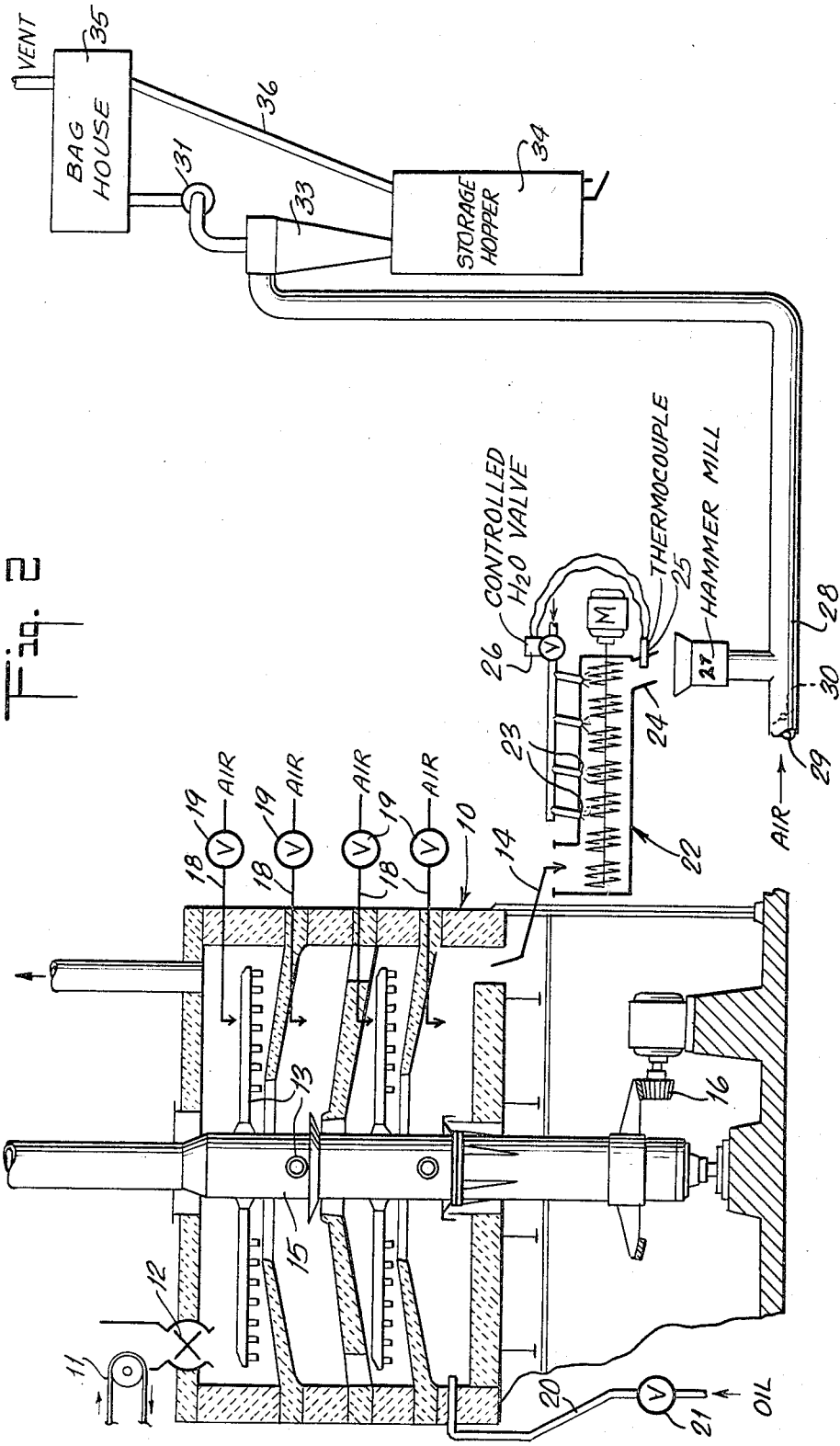

3,379,622
FORMING CHARCOAL IN AN AIR AMBIENT
Charles F. von Dreusche, Jr., Cresskill, N.J., assignor to Nicholas Engineering & Research Corporation, New York, N.Y., a corporation of Delaware
Filed July 10, 1964, Ser. No. 381,774
5 Claims. (Cl. 201—8)

This invention relates to the conversion of waste wood material such as bark, wood chips, small tree branches and the like to form charcoal such as is particularly adapted among other possible uses for the forming of briquettes for use as a fire source for cooking grills and the like.

Various methods have, of course, been known for many years for forming charcoal from wood and in the past such methods were the subject of extensive work and investigations particularly with a view to using the evolved gases as a source of various chemical materials, but in more recent years due to the more easily and economically available alternative methods in the petro-chemical arts, the charring of wood for such purposes has fallen into disuse so that concurrently there are vary few remaining establishments engaged in the production of charcoal to obtain chemicals derived from the distillation of wood. While the production of charcoal from wood for various metallurgical and industrial uses, as well as for forming briquettes, has in recent times increased markedly, the current methods therefor generally involve the application of heat to small logs of wood which are conveyed on carts through furnace equipment or are allowed to settle down through vertical shaft kilns or the like. In connection with such methods, efforts have been made to utilize the volatiles of the effluent gas stream for their fuel valves. However, heretofore such equipment has been costly to install and maintain particularly because the volatiles from wood distillation contain tarry substances which tend to condense and are not easily soluble so that they cause difficulties in clogging the apparatus. With such methods it is generally necessary to utilize waste wood in the form of sizable slabs or branches so that when piled into carts or shaft kilns same will be readily permeable whereby hot gases rising therethrough may have ready access to all parts of the wood and the volatiles produced are not hindered from leaving the charge. Hence, at best only very limited amounts of wood in the form of chips, bark or the like may be included in the charge and it is necessary to more or less limit or classify the feed so as to provide a relatively large mean particle size as distinguished from the possibility of using waste wood material of particle sizes of the order of small fractions of an inch with the present invention.

In the production of charcoal from wood materials, it has been found that extraordinary steps must be taken to overcome the problem of spontaneous combustion in the charcoal after being produced. That is, heretofore, in producing charcoal by charring wood material, it has been found that the product even after cooling, has an inherent tendency to ignite by itself which has lead to the necessity of subjecting the charcoal to a so-called "aging" or "conditioning" step. To this end, a common practice has been to take the charcoal after leaving the kiln and to seal same into large metal cans for a period as long as a number of days after which the cans are left partially open for a number of days. The precise reason why such charcoal even after apparently becoming cooled tends to ignite is not fully understood, but possibly it is because some spots therein may be activated or be in an overactive condition so that when same come into contact with sufficient oxygen of the air spontaneous combustion takes place. This will occur even if the apparently cooled charcoal is merely left open in a pile of substantial size. The effect of "aging" such charcoal for a number of days while sealed in metal cans is also not fully understood, but apparently this deactivates such spots of spontaneous combustion. Yet, such procedure gives rise to expensive delays in storing and rehandling the product.

In accordance with the present invention, however, a novel method and equipment is provided which makes possible the production of charcoal of a surprisingly uniform quality utilizing woody feed material such as bark, small tree limbs, twigs and other waste wood and wood chips, which cannot ordinarily be used in the above referred to vertical kiln equipment nor in equipment such as where the material is carried through a furnace by a succession of carts. But with the present invention, it has been found possible to provide a charcoal of high quality which may be readily formed into briquettes which may be easily ignited and which are derived from such waste wood readily available for example from paper and pulp mills and of categories for which heretofore there were few, if any, worthwhile commercial uses.

Further, in accordance with the present invention, it has been found that by using waste wood material of types above referred to including bark or bark alone if preferred, same may be efficiently charred to form a surprisingly uniform prouct by rabbling layers of same over a hearth or a succession of hearths in a furnace in the presence of hot gases. To this end, a relatively critical step in the method is the provision of limited amounts of air introduced at numerous separate points at locations above the layers of materials being rabbled. The amount of air thus admitted at each separate point is so limited that the mixture of smoke and volatiles above each local region of the layer of material being rabbled will be such as to burn only to the extent necessary to heat and char the wood material and still leave a high percentage of the material in charcoal form.

After thus charring the material, it is discharged from the rabbling hearth areas and if then it is exposed to the atmosphere, it will be of such a temperature as immediately to burn and become destroyed. Thus, at this point, the problem is encountered of efficiently and rapidly cooling the product and dissipating the above described tendency for spontaneous combustion later to occur therein even after cooling. In accordance with the present invention, this problem is solved by leading the charred material, while still enclosed, first directly through mixing and conveying means for a short interval and in which the char is sprayed with a controlled amount of water to reduce its temperature to the region of the boiling point or just above. The material may then be exposed to the air without immediate buring, but if allowed to stand as in a pile thereof, the spontaneous combustion effects above described would soon take place. Thus, further in accordance with the invention, the material is then discharged preferably into a suitable hammer type mill to reduce it to the desired fineness so that it may be advanced further in the process by a pneumatic type conveyor. To this end preferably the finely divided charcoal is drawn by a suction blower for a considerable distance through a pneumatic conveyor pipe in which an amount of air is admitted substantially in excess of that required merely for conveying purposes, so that the particles become further cooled uniformly while they are all in such relatively widely dispersed condition that no overactive or "hot spots" can remain therein to give rise later to spontaneous exothermic action.

In lieu of treating the ground charcoal material by passing same through a pneumatic conveyor with an abundance of air, other arrangements if desired may be used for progressing the charcoal in such manner that the particles will be substantially separated apart while traveling in the presence of air for individually cooling same.

For example, certain types of vibrating conveyors might be used wherein the path of travel of the material thereon is enshrouded in a stream of air.

Further in accordance with the invention, preferably the pneumatically conveyed charcoal is suitably separated from the excess air and if desired after storage same may be mixed with starch solutions and formed into briquettes and dried.

Other objects, features and advantages of the invention will be apparent from the following detailed description of a preferred embodiment thereof which description should be considered in conjunction with the accompanying drawings in which:

FIG. 1 is a block diagram showing a preferred flow sheet for the method of the invention; and FIG. 2 is a somewhat schematic diagram showing certain of the important features of the equipment for carrying out the invenion.

Referring to FIG. 1 in further detail, as shown on the flow sheet, waste wood such as stored in a pile may be formed into chips by passing same through a suitable known type of chipper apparatus and then carried as by a chip conveyor to a chip storage pile. At the same time and generally there will be available substantial quantities of wood bark or in some instances, the material to be used may be constituted wholly of wood bark provided at a storage pile as indicated. Any suitable form of loader may be used as indicated in the diagram to take chips and bark from their respective piles. The loader may be of a type, if desired, for taking predetermined portions of the wood each from the chip storage and from the bark storage piles. Preferably, by using a suitable known form of drag conveyor, the material is then introduced to a disintegrator such as for example as sometimes referred to as a "hog" and in which the material may be reduced to sizes of for example ⅜ inch by 1 inch and then carried by a conveyor or elevator to the top entrance of a furnace, preferably a multiple hearth type furnace arranged and operated as described in further detail below in connection with FIG. 2.

From the furnace as further shown by the diagram of FIG. 1, the material is passed through a suitable mixing and cooling conveyor where it is subjected to water sprays. Thence the material passes through a hammer mill where it is further reduced in size to the desired extent, for example about 7/16 inch down to sizes which will pass through a screen having say, about 325 meshes per inch. Thence the material is conducted by a pneumatic conveyor as further hereinafter explained to apparatus such as a cyclone for separating out the excess air and thence to a suitable storage bin. Thereafter the charcoal product, by known methods may be mixed with a starch solution coming from a starch cooker as indicated and the mixture then passes through a briquette press and is dried and stored. Finally, the briquettes may be passed through a "grizzly" to remove broken pieces before packing.

Referring further now to FIG. 2, the above referred to multiple hearth furnace is here shown at 10, the material being fed thereto by a suitable conveyor 11 which discharges into the top of the furnace through suitable inlet means such as will exclude entrance of the atmosphere, for example a star type feeder 12. As here shown, the furnace is provided with four circular superposed hearths constructed in accordance with practice well known, for example in the Herreshoff furnace art. Each of the hearths is accompanied by rotating radially extending rabbling arms as shown at 13 having numerous depending teeth thereon for rabbling the material on the hearths gradually inwardly and outwardly respectively on alternate hearths and through hearth openings down through the furnace to an outlet 14. The rabbling structure may be formed if desired with conventional cooling cavities, the rabbling arms being carried by a central shaft 15 rotated at variable speeds as by motor and gear means of a well known type such as indicated at 16.

At spaced points, preferably around at the upper wall surface portions of the spaces above each hearth, a plurality of conduits are provided such as indicated at 18 each for projecting into the area above the material being rabbled on the hearths, spaced-apart streams of air controlled by valves such as indicated at 19. For example, in the upper hearth space two of such air projecting conduits may be provided whereas in the three lower hearth spaces, four or more are provided, each with a control valve. The inner ends of these pipes or conduits are so located as to be spaced somewhat away from the regions where the material falls into the furnace or falls through drop holes from one hearth to the next, and the air streams provided in the lower hearth space preferably are spaced from the furnace outlet.

At the lower hearth space also one or more fuel oil burners may be provided as indicated at 20 controlled by a valve as at 21 for burning a limited amount of extraneous fuel in this hearth spade, particularly for purposes of starting up the process and generally it will be unnecessary to provide such fuel after the process comes into full operation.

In a typical example of the process which has been found to give highly satisfactory results, four hearths are provided, each having a diameter of about 20 feet. The material may be introduced onto the hearths at a rate such that a layer thereof on each hearth will be fairly thick, for example 4 inches or possibly up to several times that thickness, provided the rabbling structure is adequate uniformly, forcefully and continuously to thoroughly rabble the material as it is advanced over the hearths. In general, the upper two hearths essentially comprise drying hearths where the moisture is evaporated from the waste wood material, whereas on the two lower hearths, charring progressively occurs so that in a typical case where the material is essentially waste wood, some 25 to 33 percent thereof will remain in thoroughly charred charcoal form after treatment. In cases where the material is essentially hard wood bark, the percentage of charcoal remaining may be from 27 to 36 percent of the original amount of material. The time taken for the material to pass over the hearths and down through the furnace may be varied considerably and may be adjusted by trial depending upon the rate of feed and the temperatures adopted at each hearth, and also the moisture content of the feed, while taking into consideration the highest possible percentage of recovered charcoal. With such examples of the invention, the temperature of the gases above the two upper heaths may vary from about 800° to 1400° F. and preferably in the spaces above the two lower hearths, the gases may be kept within a range of about 1000° to 1400° F., preferably around 1200° F. which temperature will not cause excessive loss of volatiles and consequent loss of yield.

In any event, the amount of air admitted at each hearth space is relatively critical and generally will have to be adjusted by trial taking into consideration the above mentioned varying conditions and so that there will be sufficient oxygen introduced into the smoke and volatile gas mixture above each hearth to cause some burning and flames therein, without substantial burning in the layers of solid material being rabbled lest the percentage of the charcoal product be unduly diminished. It is further of relatively critical importance that the admitted air streams be sufficiently spaced-apart or distributed that none of the local regions within the hearth spaces will have sufficient oxygen to cause combustion of more than a relatively small portion of the smoke and volatiles present. That is, if say, at one hearth the air should be admitted largely at one point, excess burning of smoke and gases or even of the charred wood thereunder would occur giving rise to uneven temperature conditions too hot at certain regions and too cool at other regions for efficient charring.

At the furnace outlet 14 the charred material without being exposed to the atmosphere is preferably, in accordance with the invention, dropped into a screw type conveyor 22 which may be provided with one, two or more helical cut flight conveyor elements so as to rapidly advance the charcoal while mixing same with water introduced as through spray nozzles 23. Such conveyor means is so designed as to advance the material therethrough in a relatively short period of time, for example 3 to 4 minutes up to 10 minutes during which the charcoal is subjected to moisture throughout but because of the temperature present, the material does not remain moistened in an accurate sense of that term. The material is thus however reduced in temperature to preferably somewhat above the boiling point of water, for example about 220° F. to 300° F. before being discharged from the conveyor outlet 24. The outlet as indicated may be provided with a thermocouple or other temperature sensing device connecting either pneumatically, electrically or otherwise to valve controlling means as at 26 so controlled by the temperature sensing device as to regulate the amount of spray water at the spray nozzles 23 that the temperature of the discharged material will be within a range such as above stated.

The charcoal as discharged from the outlet 24 will now have been reduced in temperature sufficiently so that it will not tend immediately to ignite on exposure to the atmosphere yet it must, for reasons above explained, be further treated to prevent overactive or "hot spots" therein from later causing spontaneous combustion upon exposure to the air. The material also is now in a condition ready to be commercial ground to the final desired particle size for the charcoal and this may be done by discharging the material from the outlet 24 into the inlet of a suitable hammer mill 27 as above referred to, within the particle size may be reduced say to 7/16 inch down to about sizes which will pass through screens having 325 meshes per inch.

From the hammer mill 27, the material is allowed to fall into a pneumatic conveyor pipe 28 into one end of which as at 29 a supply of air is drawn by suction through damper means 30 by a suction blower 31 hereinafter referred to. The amount of air drawn into this conveyor pipe is preferably adjusted so as to amount to two or three times the amount which would be normally required merely to convey along the finely divided charcoal. This conveyor pipe may extend for a considerable distance say, from 20 to 100 feet or more and within this pipe, the charcoal particles become separated or disbursed with each surrounded by an abundance of relatively cool air which insures against the possibility that any particles will remain in such activatable or heated condition as to possibly thereafter cause spontaneous combustion. Thus, by the steps of preliminarily conveying the charcoal as discharged from the furnace past the water sprays 23 to substantially reduce the temperature thereof and then grinding same in the hammer mill and further pneumatically conveying same with an abundance of air, the so-called aging or conditioning steps heretofore considered necessary to prevent spontaneous combustion in the product may be dispensed with substantial savings in time, convenience, labor and storage costs.

After treatment of the material in the pneumatic conveyor pipe 30, there remains the problem of efficiently separating the excess air from the conveyed material. This may be accomplished by discharging the stream into a cyclone as indicated at 33 from which the coarser material falls into a storage hopper 34 and the finer material together with the excess air is drawn by the suction blower 31 from the middle of the top of the cyclone, same being thence conveyed to any suitable means for separating out the dust particles, for example, a so-called bag house as at 35 from which the air may be ventilated at the top, whereas the fines may be carried therefrom by a conduit 36 to the storage hopper 34.

Thereafter the steps of mixing the charcoal with starch solutions, forming briquettes thereof, drying, storing, etc. may be carried out as above referred to.

The resulting product particularly if formed wholly or largely of charred wood bark has been found to give a highly uniform product and with the briquettes thereof being unusually easily and promptly ignitable.

Although particular embodiments of the invention are herein disclosed for purposes of explanation, various modifications thereof after study of this specification may be apparent to those skilled in the art to which the invention pertains. Reference should accordingly be had to the appended claims in determining the scope of the invention.

What is claimed as new and desired to be secured by Letters Patent is:

1. Process for treating wood material in the form of bark, wood chips, small tree branches or the like to form charcoal, which comprises introducing a continuing supply of same in the form of small pieces onto hearth areas within a furnace, periodically rabbling and advancing a substantial layer thereof over the hearth areas while maintaining temperatures above said areas sufficiently high to cause charring of the material, by introducing into the furnace spaces above said areas, distributed streams of air and therewith causing some burning and flames in the smoke and volatile gases present without substantial burning of the material, discharging the resulting hot charcoal from the furnace and advancing same by conveying means, while mixing therewith spray water sufficient to cause substantial cooling thereof, then milling same to finely divided particle size, and then conveying same through a pneumatic conveyor pipe through which the particles are advanced for a substantial distance in dispersed condition by a stream of air.

2. Process for treating wood material in the form of bark, wood chips, small tree branches or the like to form charcoal, which comprises introducing a continuing supply of same in the form of small pieces onto hearth areas within a furnace, periodically rabbling and advancing a substantial layer thereof over the hearth areas while maintaining temperatures above the first of said areas within a range of about 800 to 1400° F. and above subsequent areas of about 1000 to 1400° F. by introducing into the furnace spaces above said areas, streams of air and therewith causing some burning and flames in the smoke and volatile gases present without substantial burning of the material, said streams being sufficient only and so distributed that the local regions within said spaces will have insufficient oxygen to cause combustion of more than a relatively small portion of said smoke and volatiles, discharging the resulting hot charcoal from the furnace and advancing same by conveying means, while mixing therewith spray water sufficient to cause cooling thereof to temperatures in a range of about 220 to 300° F., then milling same to finely divided particle size, then conveying same through a pneumatic conveyor pipe through which the particles are advanced in dispersed condition by a stream of air, then separating air from the mass of charcoal which is then in a condition free of spots tending to cause spontaneous combustion.

3. Process for treating wood material in the form of bark, wood chips, small tree branches or the like to form charcoal, which comprises introducing a continuing supply of same in the form of small pieces onto hearth areas within a furnace, periodically rabbling and advancing a substantial layer thereof over the hearth areas while maintaining temperatures above said areas sufficiently high to cause charring of the material, by introducing into the furnace spaces above said areas, distributed streams of air and therewith causing some burning and flames in the smoke and volatile gases present without substantial burning of the material, discharging the resulting hot charcoal from the furnace, cooling to a substantial extent and milling same to finer particle size, and then conveying same through a pneumatic conveyor pipe through which the particles are advanced for a substantial distance in dispersed condition by a stream of air, then separating air from the mass of charcoal which is then in a condition free of spots tending to cause spontaneous combustion.

4. Process for treating wood material in the form of bark, wood chips, small tree branches or the like to form charcoal, which comprises introducing a continuing supply of same in the form of small pieces onto hearth areas within a furnace, periodically rabbling and advancing a substantial layer thereof over the hearth areas while maintaining temperatures above said areas sufficiently high to cause charring of the material, by introducing into the furnace spaces above said areas, distributed streams of air and therewith causing some burning and flames in the smoke and volatile gases present without substantial burning of the material, discharging the resulting hot charcoal from the furnace and thereafter reducing same to a finer particle size and conveying same for a substantial distance in dispersed condition by a stream of air.

5. Process for treating waste woody material which comprises introducing a continuing supply of same in the form of small pieces into a multiple superposed hearth furnace, rabbling and advancing same as a substantial layer thereof over the hearths and from hearth to hearth down through the furnace, while maintaining above the hearth areas sufficiently high temperatures to cause charring of the material, by introducing into the furnace spaces above the hearth areas distributed streams of limited amounts of air and therewith causing some burning and flames in the smoke and volatile gases present, but insufficient to cause substantial burning of the material.

References Cited

UNITED STATES PATENTS

| | | | |
|---|---|---|---|
| 200,662 | 2/1878 | Miles | 201—36 |
| 211,376 | 1/1879 | Brooke | 201—36 |
| 687,304 | 11/1901 | Grondal | 201—32 |
| 786,599 | 4/1905 | Repath et al. | 202—117 |
| 1,464,732 | 8/1923 | Stafford | 201—36 |
| 1,558,974 | 10/1925 | Freeman | 202—117 |
| 1,562,541 | 11/1925 | Corfield | 202—117 |
| 2,664,389 | 12/1953 | Rex et al. | 201—36 |
| 3,092,471 | 6/1963 | Stromeyer | 201—39 |

NORMAN YUDKOFF, *Primary Examiner.*

D. EDWARDS, *Assistant Examiner.*

UNITED STATES PATENT OFFICE
CERTIFICATE OF CORRECTION

Patent No. 3,379,622                          April 23, 1968

Charles F. von Dreusche, Jr.

It is certified that error appears in the above identified patent and that said Letters Patent are hereby corrected as shown below:

In the heading to the printed specification, line 4, "Nicholas" should read -- Nichols --.

Signed and sealed this 2nd day of September 1969.

(SEAL)
Attest:

Edward M. Fletcher, Jr.                  WILLIAM E. SCHUYLER, JR.
Attesting Officer                          Commissioner of Patents